UNITED STATES PATENT OFFICE.

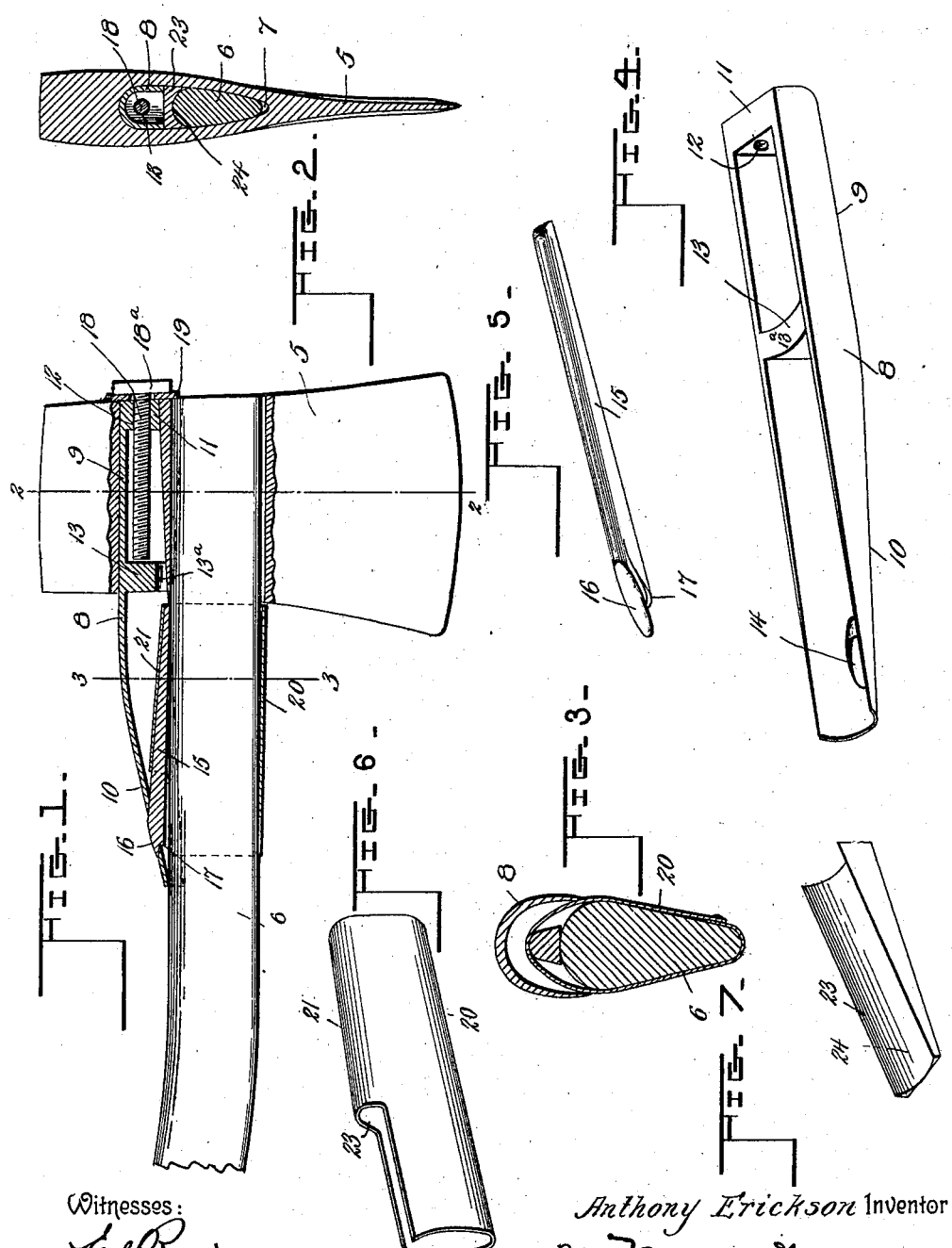
No. 687,138. Patented Nov. 19, 1901.
A. ERICKSON.
AX.
(Application filed June 5, 1901.)
(No Model.)
Anthony Erickson Inventor

ANTHONY ERICKSON, OF PRINCE ALBERT, CANADA.

AX.

SPECIFICATION forming part of Letters Patent No. 687,138, dated November 19, 1901.

Application filed June 5, 1901. Serial No. 63,177. (No model.)

*To all whom it may concern:*

Be it known that I, ANTHONY ERICKSON, a citizen of the United States of America, residing at Prince Albert, county of Saskatchewan, North-West Territories, Canada, have invented certain new and useful Improvements in Axes; and I do hereby declare that the following is a full, clear, and exact description of the invention, such as will enable others skilled in the art to which it appertains to make and use the same.

My invention relates to improvements in axes, although it is applicable to hatchets, hammers, and other tools wherein the head is to be fastened removably to a handle or helve.

Among other things, my invention has for its objects to provide an improved fastener which is adjustable to secure an exceedingly tight and secure connection between the helve and the tool-head, to secure an "over" and "under" adjustment or application of the ax-head to the handle to suit the requirements of the user, to secure a proper hang or balance of the implement, to afford protection to the handle at a point near the head and thereby minimize the tendency of the handle to break, to enable the position of the ax-head to be changed in a few moments of time instead of requiring from an hour to one hour and a half, to promote the strength and durability of the device, and to make the appliance economical of manufacture.

With these ends in view the invention consists in the novel combination, construction, and arrangement of parts, which will be hereinafter fully described and claimed.

In the drawings hereto annexed, forming a part of this specification, Figure 1 is a side elevation, partly in section, of an ax having its head fastened to the helve in accordance with my invention. Fig. 2 is a cross-section through the ax-head in the plane of the dotted line 2 2 on Fig. 1. Fig. 3 is a cross-section on the line 3 3 on Fig. 1. Fig. 4 is a detail perspective view of the tightener-wedge, representing the same in its inverted position in order to more clearly show the construction thereof. Fig. 5 is a detail perspective view of the pressure or tension rod. Fig. 6 is a detail perspective view of the protector sleeve or band. Fig. 7 is a detail perspective view of the tightener-key.

The same numerals of reference denote like parts in each of the several figures of the drawings.

5 designates the ax-head, and 6 is the handle or helve, said ax-head being provided with an eye 7, and all of these parts being of the usual or any preferred construction.

One of the important features of my invention is the tightener-wedge 8. (Shown in detail by Fig. 4 and in its operative position by Figs. 1 to 3, inclusive.) This tightener-wedge is made or formed in a single piece of malleable metal and tapered slightly at its operative end, so as to form the inclined working face 9, while the other portion of the wedge is tapered sharply, as at 10, in order that it may conform to the curvature of the handle gracefully. This tightener-wedge is made solid at one end by the provision of an integral lug 11, the same being formed with a female threaded aperture 12. Furthermore, the tightener-wedge is made hollow or chambered from the solid end lug 11 to the opposite end of the sharply-tapered portion 10 thereof, except for the provision of the reinforcement 13, which is made integral with the sides of the hollow wedge and serves to prevent collapsing thereof, said reinforcement having a curved face 13$^a$. (See Figs. 1 and 4.)

In the embodiment of the invention shown by the drawings the sharply-curved end 10 of the tightener-wedge is provided with a longitudinal slot 14, the same adapted to receive a pressure or tension rod 15. (See Figs. 1 to 5.) This rod is beveled at one end, as at 16, and it is undercut or notched in order to form an inclined lip 17, said lip being shorter than the nose, which is formed by the beveled end 16 of the rod. Said rod is arranged in the chambered portion of the tightener-wedge, so as to have its nose 16 project through the slot 14, while the lip 17 fits within the slotted portion of the wedge in such a way as to coöperate with the nose 16 in order to connect the pressure or tension rod to the tightener-wedge detachably. It is essential that the tension or pressure rod shall occupy an inclined relation to the longitudinal axis of the tightener-wedge, and said rod is adapted to be seated upon the handle 6 in a manner to exert pressure against the wedge for the purpose of forcing the same into tight frictional engagement with the wall of the eye 7 in the tool-head. Although I have shown and described a preferred construction for detachably connecting the pressure-rod to the tightener-wedge, I do not strictly limit myself to this embodiment of the invention, because I am aware that the pressure-rod may be made fast to the tightener-wedge—as, for example, by welding the rod to the wedge or by riveting the parts together.

18 designates a fastening and adjusting screw which is provided with an enlarged head 18$^a$, that is adapted to bear against a washer 19, the latter being interposed between the screw-head and the ax-head 5 and the end of the handle 6. (See Fig. 1.) The shank of this screw is quite long, and it is adapted to have threaded engagement with the female threaded opening 12 in the solid end lug 11 of the tightener-wedge, said screw-shank arranged to occupy the space between said end lug and the reinforcement 13 of the tightener-wedge, as shown by Fig. 2.

20 designates a protector sleeve or band, the same being preferably made in a single piece of malleable metal and arranged to fit around the helve or handle 6, so as to cover and protect the same for some distance in rear of the ax-head 5. One side of this protector band or sleeve is inclined, as at 21, and provided with a notch at 22, (see Fig. 6,) and this notched inclined side of the sleeve is adapted to have the pressure or tension rod 15 thrust therethrough, as shown by Fig. 1, whereby the rod serves to hold the protector-band against displacement on the handle and is also made to react against the tightener-wedge for the purpose of fitting the latter tightly into the eye of the axle.

23 designates the key. (Shown by Fig. 7.) Said key is provided with a grooved underface 24, arranged to snugly conform to the edge of the helve 6, and said key is forced into place between the helve and the lug 11 and reinforcement 13 of the tightener-wedge. (See Fig. 1.)

In assembling the parts of my improved fastening the protector band or sleeve 20 is first adjusted on the ax-handle in a manner to allow sufficient room for the reception of the ax-head. The pressure-rod 15 is now engaged with the slotted end of the tightener-wedge, and this wedge is adjusted to the ax-handle in a manner for the pressure-rod to enter the notched and inclined side of the protector-band. The tightener is now pressed forward until its lug 11 is practically in flush relation with the end of the handle and then the ax is adjusted for its eye to receive the handle and the front end of the tightener-wedge. The operator now drives the key 23 into place between the handle and the wedge and the bolt or screw 18 is then inserted into place. In disconnecting the parts for the purpose of reversing the ax the bolt or screw is first removed and the tightener-wedge is tapped a little until the ax-head becomes loose on the handle, thus facilitating the disconnection of the parts.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a tool of the class described, the combination with a handle and a tool-head, of a tightener-wedge fitting the eye of the tool-head and having a pressure device seated upon the handle, and a supplemental fastening connecting the tightener-wedge with the handle or tool-head, substantially as described.

2. In a tool of the class described, the combination with a handle and a tool-head, of a tightener-wedge engaging the eye of the tool-head, a pressure-rod engaging with the tightener-wedge and the handle, and supplemental fastenings for connecting said tightener-wedge with the handle or tool-head, substantially as described.

3. In a tool of the class described, the combination with a handle and a tool-head, of a tightener-wedge, a protector band or sleeve fitted to the handle, a pressure-rod engaging the tightener-wedge and the protector-band and seated upon the handle, and supplemental fastenings for connecting the tightener-wedge with the handle, substantially as described.

4. In a tool of the class described, the combination with a handle and a tool-head, of a protector band or sleeve having a notched and an inclined side and fitted upon the handle, a tightener-wedge, a pressure-rod connected to the tightener-wedge and having engagement with the inclined side of the protector-band and with the handle, and supplemental fastenings for connecting said tightener-wedge with the handle or the tool-head, substantially as described.

5. In a tool of the class described, the combination with a handle and a tool-head, of a chambered tightener-wedge having a threaded bearing, a pressure device between the handle and the tightener-wedge, a screw seated against a washer and connected with the threaded bearing of the tightener-wedge, and a key, substantially as described.

In witness whereof I have hereunto set my hand in the presence of two witnesses.

ANTHONY ERICKSON.

Witnesses:
JOSEPH READ,
P. J. FLANAGAN.